United States Patent
Chappell et al.

(10) Patent No.: US 7,213,771 B2
(45) Date of Patent: May 8, 2007

(54) SOAKER HOSE AND GROUND ANCHOR ASSEMBLY

(75) Inventors: David Chappell, The Grange Queensland (AU); Wendy Trinder, Albany Creek Queensland (AU); Eve Edmonds, Hawthorne Queensland (AU)

(73) Assignee: PPI Corporation Pty Ltd, Geebung, Queensland (AU)

( * ) Notice: Subject to any disclaimer, the term of this patent is extended or adjusted under 35 U.S.C. 154(b) by 506 days.

(21) Appl. No.: 10/771,880

(22) Filed: Feb. 4, 2004

(65) Prior Publication Data

US 2004/0222314 A1 Nov. 11, 2004

(30) Foreign Application Priority Data

Feb. 10, 2003 (AU) .............................. 2003900575

(51) Int. Cl.
*B65H 75/00* (2006.01)
*B05B 15/00* (2006.01)
*B65H 75/18* (2006.01)

(52) U.S. Cl. ...................... 239/198; 239/195; 239/197; 239/450; 137/355.16; 242/397; 242/400.1; 242/407; 242/395.1; 285/12

(58) Field of Classification Search ................ 239/276, 239/279, 273, 542, 547, 1, 195, 197, 196, 239/198; 137/355.23, 355.16, 355.26, 355.27; 242/395–407; 285/12
See application file for complete search history.

(56) References Cited

U.S. PATENT DOCUMENTS

| 1,613,336 | A |   | 1/1927 | Thompson |
|---|---|---|---|---|
| 1,737,832 | A |   | 12/1929 | Deming |
| 2,657,096 | A |   | 10/1953 | Holmes |
| 2,954,194 | A |   | 9/1960 | Alfano |
| 3,195,818 | A |   | 7/1965 | Herberg |
| 3,199,817 | A | * | 8/1965 | Fox .............................. 248/87 |
| 3,443,771 | A | * | 5/1969 | Doty ........................ 242/405.1 |
| 3,603,511 | A |   | 9/1971 | Pierre et al. |
| 3,941,342 | A |   | 3/1976 | Bradshaw |
| 4,135,668 | A |   | 1/1979 | Winkler et al. |
| 4,440,370 | A |   | 4/1984 | Rood |
| 4,582,257 | A | * | 4/1986 | Siegler ........................ 239/197 |
| D284,785 | S | * | 7/1986 | Lemkin et al. ............. D23/221 |
| 5,014,925 | A |   | 5/1991 | Cump |
| 5,265,822 | A | * | 11/1993 | Shober et al. ............ 242/388.2 |
| 5,421,533 | A | * | 6/1995 | Scott et al. ............... 242/405.3 |
| 5,549,262 | A | * | 8/1996 | Whitehead .................... 248/87 |
| 5,655,728 | A | * | 8/1997 | Yang ........................ 242/395.1 |
| 5,673,858 | A | * | 10/1997 | Asakawa et al. ......... 239/553.3 |
| 5,687,909 | A | * | 11/1997 | Dean ........................... 239/276 |

(Continued)

FOREIGN PATENT DOCUMENTS

CA 1307513 9/1992

*Primary Examiner*—Kevin Shaver
*Assistant Examiner*—James S. Hogan
(74) *Attorney, Agent, or Firm*—Renner, Otto, Boisselle & Sklar, LLP

(57) ABSTRACT

A garden soaker hose and reel assembly includes a ground anchor on one end of the soaker hose which is rigidly fixed to the soaker hose. The reel has a special configuration to make the soaker hose easier to unwind from the reel and to wind back onto the reel. The soaker hose can be provided with a stripe on the upper wall of the soaker hose to make it easily apparent if the hose is twisted.

4 Claims, 4 Drawing Sheets

U.S. PATENT DOCUMENTS

| | | | | |
|---|---|---|---|---|
| 5,785,785 A | * | 7/1998 | Delmer et al. | 156/203 |
| 5,881,495 A | * | 3/1999 | Clark | 47/48.5 |
| 5,984,224 A | * | 11/1999 | Yang | 242/400.1 |
| 6,161,874 A | * | 12/2000 | Yang | 285/12 |
| 6,460,786 B1 | | 10/2002 | Roberts | |
| 7,066,403 B2 | * | 6/2006 | Heren et al. | 239/271 |
| 2003/0150963 A1 | * | 8/2003 | Doring | 248/76 |

* cited by examiner

SOAKER HOSE AND GROUND ANCHOR ASSEMBLY

FIELD OF THE INVENTION

This invention is directed to a soaker hose and ground anchor assembly which allows the soaker hose to be better placed in position and which can reduce twisting of the soaker hose. The invention is also directed to a hose reel which is of particular design to assist in unrolling the soaker hose from the reel.

BACKGROUND ART

A soaker hose is a well-known product and comprises a flattened plastic hose containing small openings in a top face. One end of the soaker hose is provided with a hose coupling. The other end (the tail end) is usually provided with a small plastic plug. Sometimes, the tail end of the soaker hose is simply welded shut.

One disadvantage with a soaker hose is that the hose is prone to twisting as it is laid on the ground. Any twisting will result in water spraying from the hose in the wrong direction and this is undesirable.

It is known to lay bricks or heavy weights on the hose to keep it straight as the hose is positioned in place.

It is also known to provide ground stakes which contain some form of finger clamping mechanism to clamp about the hose body to hold the hose in place. These ground stakes are often used if it is desired to have the hose adopt a deliberate somewhat twisted shape such that water passes from the hose in a desired direction. These ground stakes are always removably attached to the soaker hose body and are not designed to stay attached to the soaker hose. Another disadvantage with these ground stakes are that they can block some of the holes in the soaker hose which is undesirable. Examples of these types of ground stakes are found in U.S. Pat. No. 4,135,668, U.S. Pat. No. 4,440,370, U.S. Pat. No. 2,954,194, U.S. Pat. No. 3,941,342 and Canadian patent 1307513. Therefore, it is not desirable to have a ground stake attached intermediate the length of a soaker hose.

It is known to provide some form of anchor assembly on one end of a soaker hose. For example, U.S. Pat. No. 3,199,817 and U.S. Pat. No. 3,195,818 describe such devices. However, a main disadvantage with these known devices is that the anchor allows the soaker hose to swivel or rotate. This is a disadvantage with soaker hoses as it is always highly desirable to ensure that when the soaker hose is laid on the ground, it is always laid in the "upright" position to ensure that the perforations in the soaker hose extends upwardly.

Another disadvantage with a soaker hose is that to keep the hose from twisting, it is desirable to store the hose in a substantially non twisted manner. Therefore, some form of soaker hose reel would be advantageous as this could keep the soaker hose in a non twisted position when being stored. However, it is found that storing the hose on a circular hose reel tends to promote twisting of the hose. Also, conventional hose reels have some disadvantages in the easy and smooth unrolling of the soaker hose from the hose reel.

It can be quite difficult to unwind a soaker hose from the reel and onto a ground surface while preventing twisting of the soaker hose and preventing the soaker hose from being dragged along the ground as the hose is unwound from the reel.

Finally, conventional soaker hoses are usually made from a top piece and a bottom piece that are welded together to form the hose. These pieces are identical, and small openings are punched or otherwise formed in the top piece. A disadvantage with the system is that it is extremely difficult to see if the hose is in the "upright" position or the "upside down" position as the only way that this can be seen is by viewing the openings, and the openings are usually no more than a pinprick in size making it very difficult to see if the soaker hose is indeed in the proper upright position.

It will be clearly understood that, if a prior art publication is referred to herein, this reference does not constitute an admission that the publication forms part of the common general knowledge in the art in Australia or in any other country.

OBJECT OF THE INVENTION

The present invention is directed to a soaker hose which can be provided with improvements to the hose, improvements to the hose reel and the like.

In one form, the invention resides in a soaker hose, the hose having a first end and a second end, and a ground anchor which is non removably attached to one said end, the ground anchor having a spike portion adapted to be pushed into the ground, and a soaker hose attachment portion which attaches to the soaker hose in such a manner that the soaker hose end cannot rotate relative to the spike portion.

In another form, the invention resides in a ground anchor for a soaker hose, the ground anchor comprising a ground engaging member, and a hose engaging member, the hose engaging member comprising a sleeve which fits over the hose to retain the ground anchor to the hose.

Preferably, the ground anchor is attached to the hose in such a manner that when the ground anchor is inserted into the ground, the hose is in the upright position where the openings in the hose are pointing upwardly. Thus, when the ground anchor is inserted into the ground, the hose is already orientated correctly.

The ground anchor typically has a ground engaging member or ground engaging means. This may comprise a spike, a number of spikes, a tooth, a claw, or any other type of ground engaging means. In a broad form, the ground engaging means may be positioned on the ground or may be substantially pushed into the ground or may have one part which stays on the ground and another part which is pushed into the ground. For instance, the ground engaging means may comprise some form of base member which sits on top of the ground and a spike or similar member which is inserted into the ground.

The ground anchor may be provided with a sleeve, collar, or similar member which fits about the end of the soaker hose. The sleeve may be entirely closed, or may comprise a pair of curved fingers which fit about the end of the hose and the like. The sleeve may be a tight fit about the soaker hose to prevent or reduce rotation of the ground anchor relative to the soaker hose.

The ground anchor may be formed of plastic, metal, composite materials and the like.

Suitably, the end of the soaker hose is provided with a plug. The plug may have an outer body. The ground anchor may be attached to the soaker hose at or adjacent to the plug. In this manner, the plug can form a solid base for attachment of the ground anchor, it being appreciated that the soaker hose is relatively flexible and it may be difficult to properly attach the ground anchor to the soaker hose only.

The soaker hose may be fitted to a reel. The reel may be designed to hold the soaker hose in a substantially untwisted position thereby enabling better positioning of the soaker hose when the soaker hose is unrolled from the reel. The reel may comprise some form of accommodation for the ground anchor such that the ground anchor can remain attached to the end of the soaker hose when in use and when being stored.

The ground anchor may be fitted to the soaker hose in a non-removable manner such that the purchaser will purchase the soaker hose and ground anchor together (and possibly also the reel). Alternatively, the ground anchor can be fitted in a removable manner to allow the ground anchor to be purchased separately and fitted to an existing soaker hose.

The reel is preferably of a particular configuration to facilitate winding and unwinding of the hose in a manner that does not promote twisting of the hose. It is preferred that the reel has a wind up portion about which the soaker hose extends and that the wind up portion is oval in configuration as opposed to circular which is the conventional configuration. It is further preferred that the wind up portion as well as being substantially oval also has opposed ends which are rather sharply curved. These opposed ends which are rather sharply curved will cause the soaker hose to fold as the soaker holes is wound about the opposed ends and this folding or partial folding process causes the hose to be wound onto the reel in such a manner that does not promote twisting of the hose.

The soaker hose may be provided with visual identification means to clearly identify if the hose is in the correct "upright" position. The visual identification means may comprise a line or a plurality of lines which are of a different or contrasting colour and which extend over the top part (or bottom part) of the soaker hose. Preferably, the visual identification means comprises a pair of contrasting colour lines extending over the top part of the soaker hose (which is the part containing the openings). These lines may be attached to the soaker hose or formed in the soaker hose by any suitable technique.

BRIEF DESCRIPTION OF THE DRAWINGS

An embodiment of the invention will be described with reference to the following figures.

BEST MODE

Figure 1:
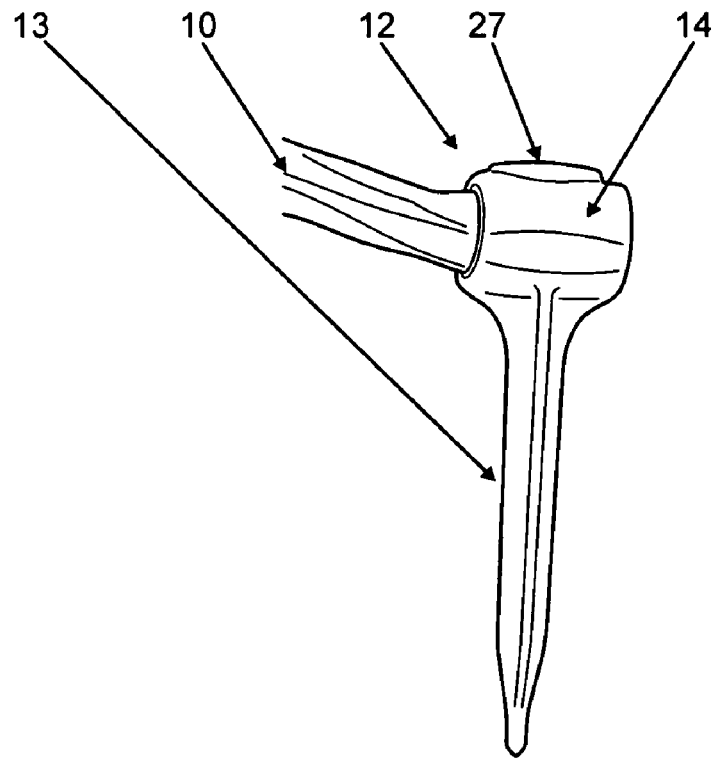
FIG. 1. Illustrates one end of a soaker hose containing a ground anchor.
Figure 2:
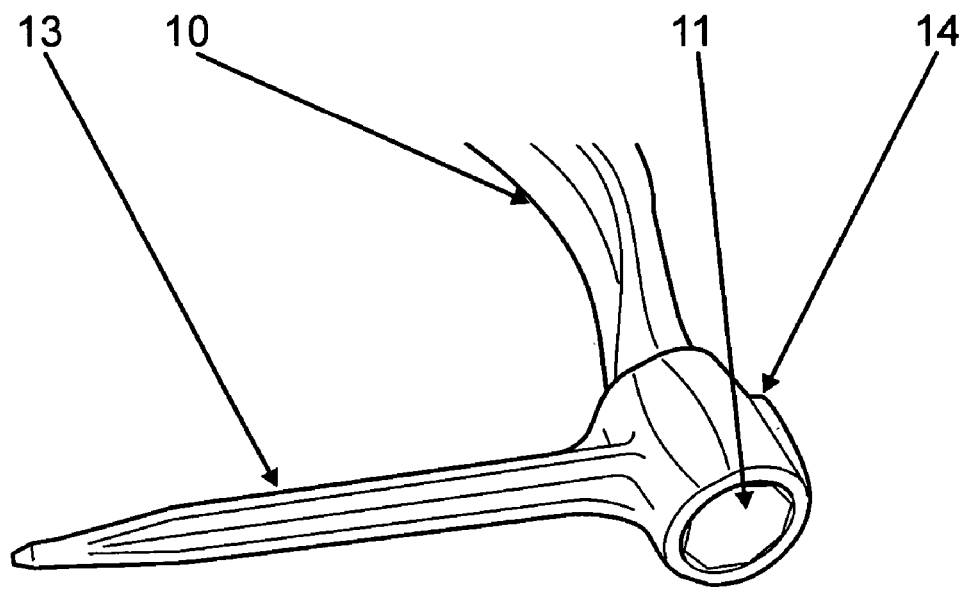
FIG. 2. Illustrates a close-up view of the end of the soaker hose and ground anchor.
Figure 3:
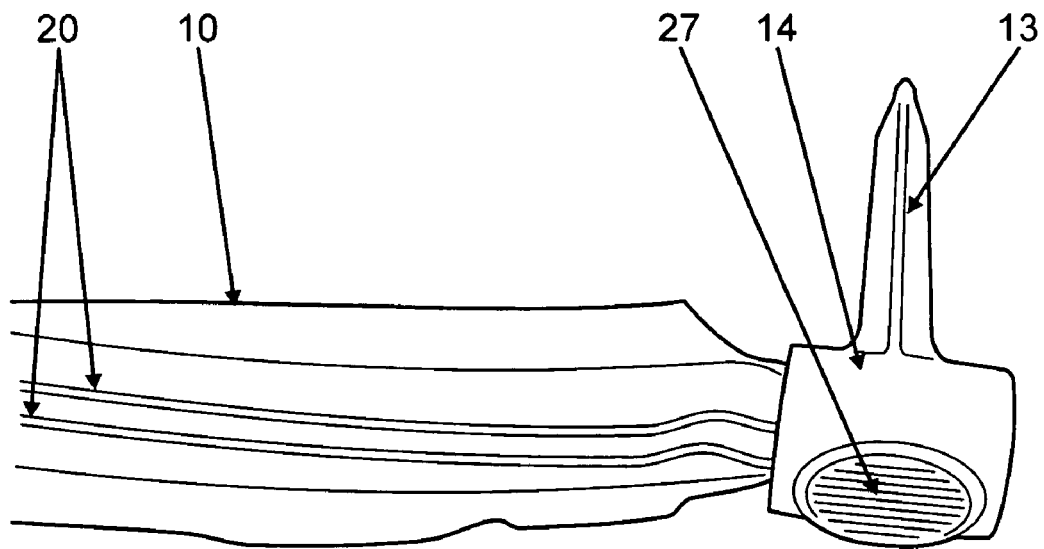
FIG. 3. Illustrates another close-up view of the end of the soaker hose and ground anchor.
Figure 4:
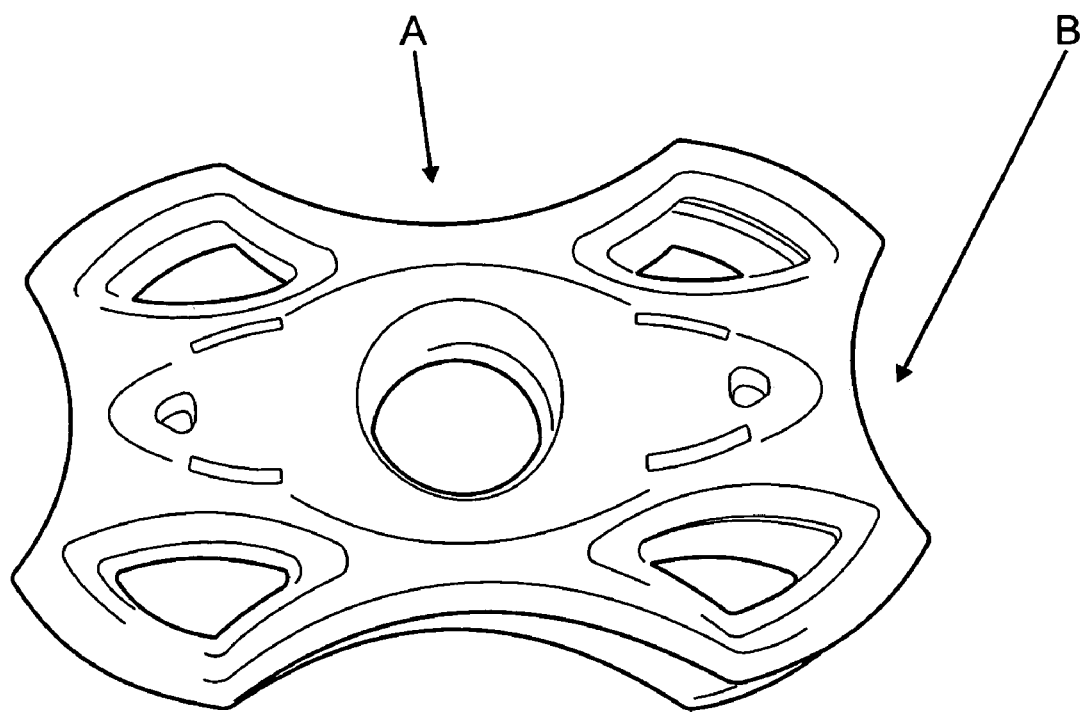
FIG. 4. Illustrates a plan view of a soaker hose reel without the soaker hose.
Figure 5:
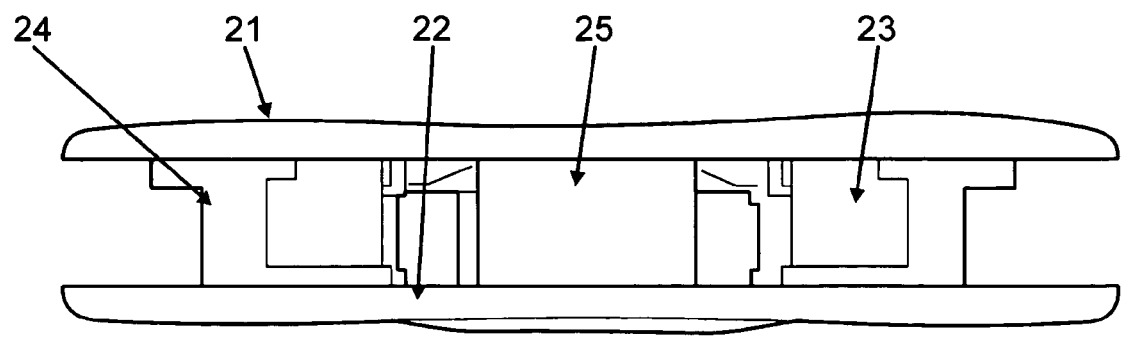
FIG. 5. Illustrates an end view from the direction of arrow A in FIG. 4.
Figure 6:
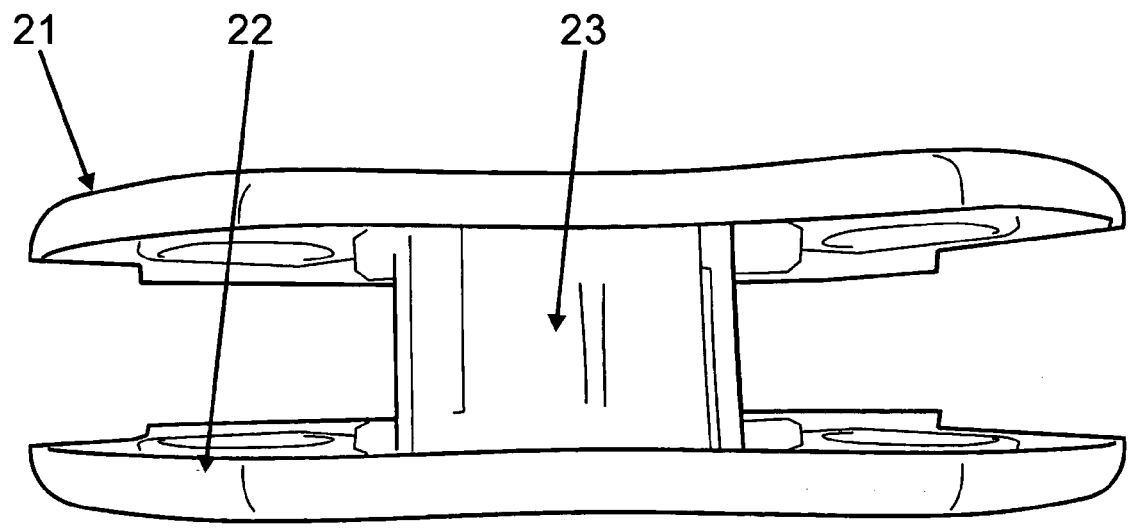
FIG. 6. Illustrates an end view from the direction of arrow B in FIG. 4.
Figure 7:
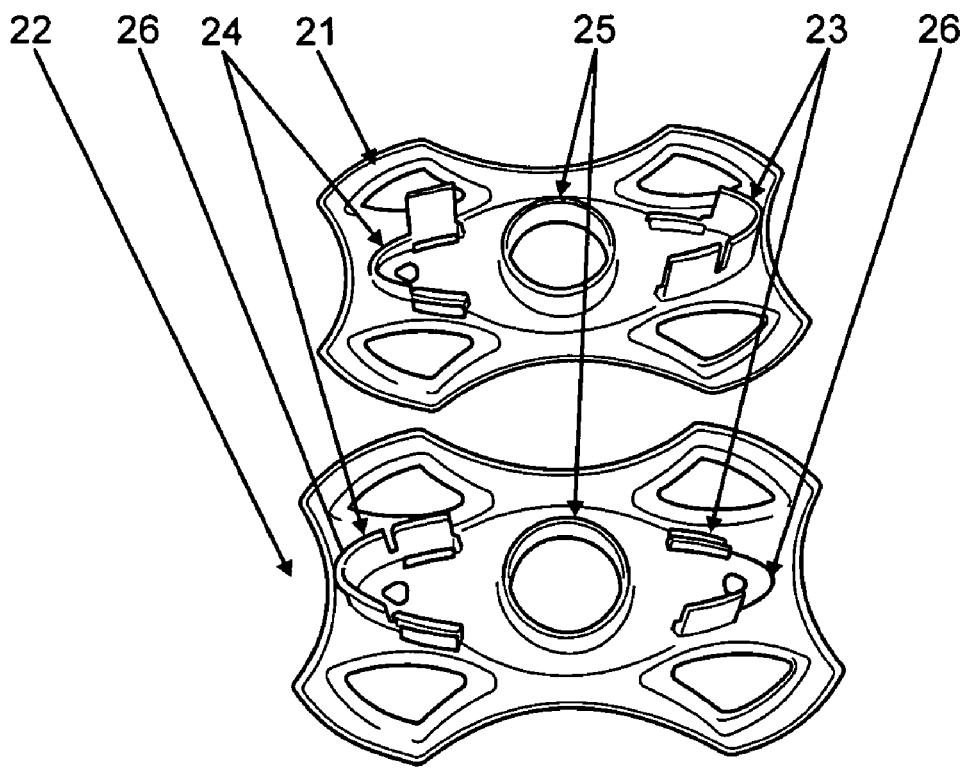
FIG. 7. Illustrates an exploded view of the hose reel.
Figure 8:
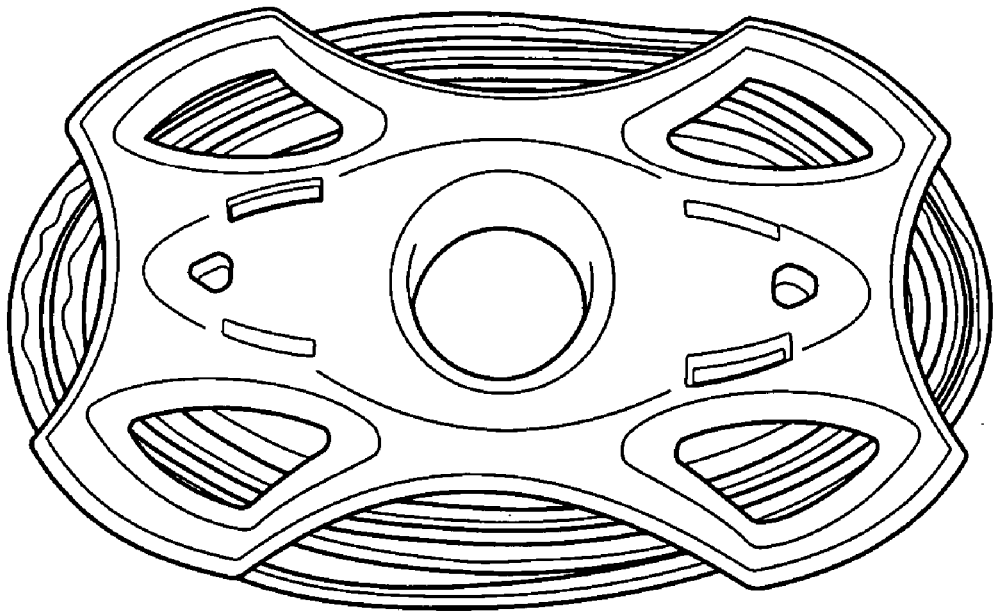
FIG. 8. Illustrates a view of the hose reel containing the soaker hose.

Referring to FIGS. 1–3, there is illustrated one end of a soaker hose 10. The soaker hose 10 can be of conventional manufacture and typically comprises a pair of plastic sheets which are welded at the longitudinal ends to form a flattened hose. One sheet is provided with spaced perforations to provide an array of water outlets. The soaker hose typically has a length of between 5–20 m and an internal inflated diameter of between 5–20 mm. These dimensions can of course vary.

The "tail" end of the soaker hose is typically plugged by a plastic plug 11 (best illustrated in FIG. 2). Plastic plug 11 is made of hard plastic material and is pushed into the end of the otherwise open soaker hose to provide a plug. Of course, the plug need not be manufactured of plastic. The end of the plug can be provided with an angular head portion to allow a tool (such as pliers) to grip the head of the plug. The flattened head portion can also facilitate insertion or hammering of the plug into the otherwise open end of the soaker hose. The plug typically has a length of between 20–40 mm and a diameter of between 10–20 mm. These dimensions can of course vary.

A ground anchor 12 is attached to this end of the soaker hose. In the particular embodiment, ground anchor 12 has a spike 13 which is pushed into the ground. The ground anchor 12 also has a hose engaging portion which in the particular embodiment comprises a tubular sleeve 14. The tubular sleeve 14 extends over plug 11 and the wall of the soaker hose which is about plug 11, this arrangement being best illustrated in FIG. 2. Thus, the tubular sleeve 14 can be quite tightly clamped about soaker hose 10 because of the internal plug 11 which provides a solid support for the ground anchor. Also, the tubular sleeve can further ensure that plug 11 is tightly clamped in place and will not be blown out of the end of soaker hose 10 under conditions of high water pressure.

Tubular sleeve 14 has a flattened top portion 27 to assist in hammering or pushing the ground anchor into the ground.

Ground anchor 12 is attached in such a manner that when the spike 13 is pushed in the ground, the soaker hose is correctly positioned (that is, the top wall containing the spray outlets is pointing upward). It is considered that this provides a substantial advantage to the working of the invention. Also, the arrangements is such that ground anchor 12 cannot rotate relative to soaker hose 11 as it is not attached by any swivel or hinged portion.

Ground anchor 12 in the particular embodiment does not overlie or block any of the apertures in the soaker hose. Instead, ground anchor 12 can be positioned such that it extends only about plug 11. Thus, there is no loss of efficiency of the soaker hose. When the ground anchor is inserted into the ground, the soaker hose can be stretched quite tightly without the ground anchor becoming dislodged and this allows a person to more easily untwist the soaker hose.

Best illustrated in FIG. 3, soaker hose 10 is provided with a pair of contrasting stripes 20 which extend over the upper part of the hose to provide a visual indication that the hose is correctly positioned. That is, as long as the stripes 20 on top of the hose, the hose is in the "upright" position.

The soaker hose may be wound onto a reel 15 which is illustrated in FIGS. 4–8. Reel 15 is formed of two parts 21, 22 (see FIG. 7) which are clipped or otherwise attached together to form the assembled reel. The reel has a "hub" portion about which the soaker hose is wound. The hub portion is not continuous and is quite oval in configuration and comprises a pair of V shaped edge portions 23, 24 (see FIG. 7) and a central circular portion 25. Therefore, the longitudinal ends of the oval configuration have quite sharp edges, the edges being illustrated in FIG. 7 as reference numerals 26. When the soaker hose is wound about the hub portion, as the soaker hose extends about the V shaped portions, the soaker hose adopts a slightly "folded" configuration at this point and is found that this type of fold prevents or reduces twisting of the hose. This makes it easier to wind the hose onto the reel or to unwind the hose from the reel with reduced twisting.

To use the soaker hose, a small length of the hose is unwound and the ground anchor is pressed into the ground. The remaining hose can then be unwound from the reel with little likelihood of twisting. Typically, a person will walk backwards while unwinding the hose from the reel to keep the hose somewhat taut as the hose is being unwound.

The other end of the soaker hose (not illustrated) can be formed with a hose coupling.

The assembly is simple, reliable, relatively inexpensive to manufacture, and will provide an easy-to-use system to use a soaker hose, to keep the soaker hose in a desired position on the ground, and to allow the soaker hose to be stored in a non twisted manner.

It should be appreciated that various other changes and modifications can be made to any embodiment described without departing from the spirit and scope of the invention.

The invention claimed is:

1. A soaker hose, ground anchor and hose reel assembly, the soaker hose having opposed ends, a top wall and a bottom wall, the top wall being provided with a plurality of openings through which water can pass, a plug fitted in one end of the soaker hose to plug said one end of the soaker hose, the ground anchor comprising a sleeve, the sleeve extending over the plug and being attached to the plug in a non-rotatable manner, the ground anchor further comprising a stake adapted for insertion into the ground, the stake having a longitudinal axis which is substantially at right angles to the top wall of the soaker hose such that when the stake is inserted in the ground, the top wall of the soaker hose extends upwardly from the ground, the hose reel having a wind up portion or hub about which the soaker hose extends, the wind up portion being oval in configuration, opposed ends on the wind up portion, the opposed ends being substantially V shaped to define sharp curves about which the soaker hose winds.

2. The assembly as claimed in claim 1, wherein the sleeve is provided with a flattened top portion.

3. The assembly as claimed in claim 1, wherein the soaker hose is provided with visual identification means to clearly identify if the hose is in the correct "upright" position.

4. The assembly as claimed in claim 3, wherein the visual identification comprises a line or a plurality of lines which are of a different or contrasting colour and which are on the top wall of the soaker hose.

* * * * *